UNITED STATES PATENT OFFICE.

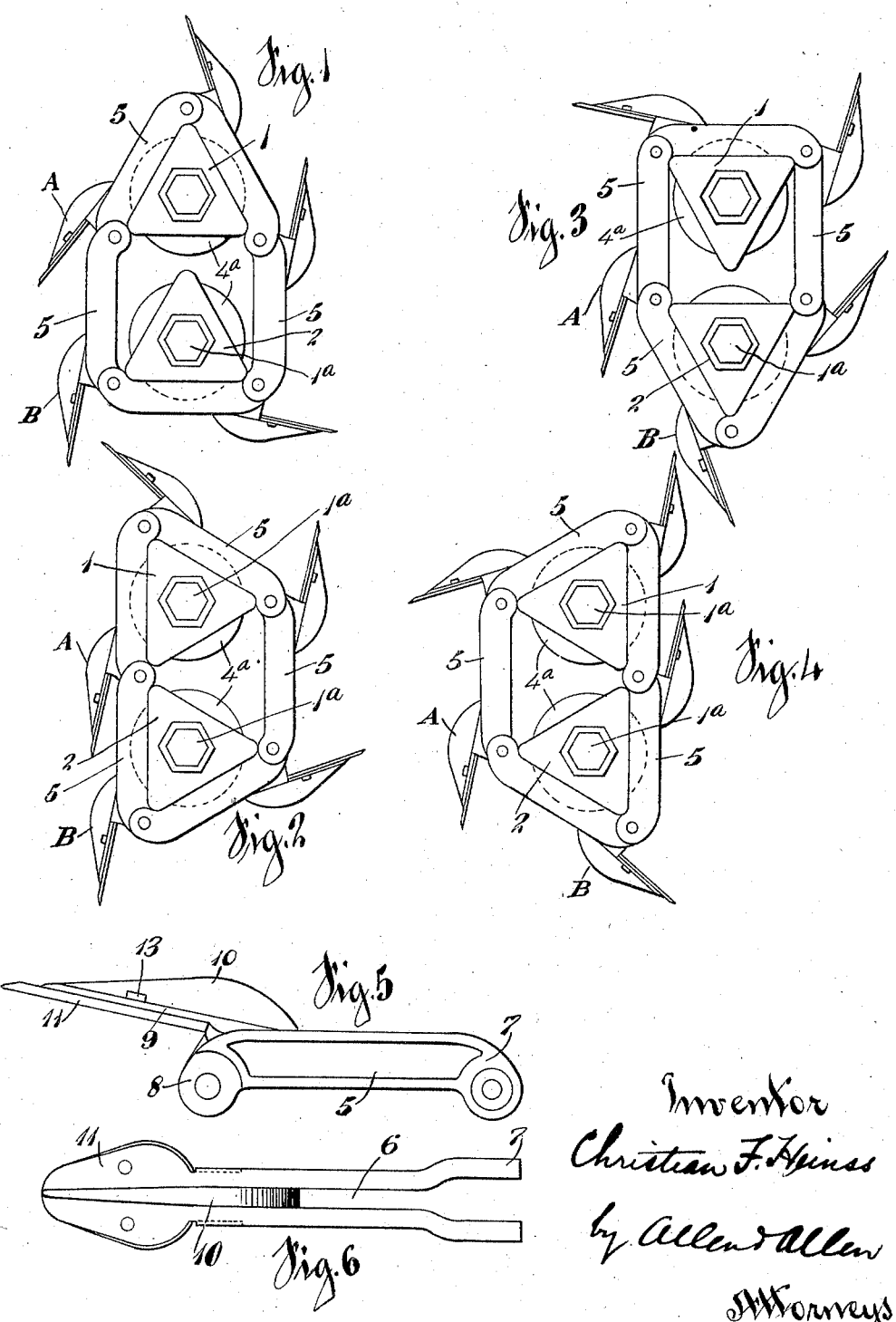

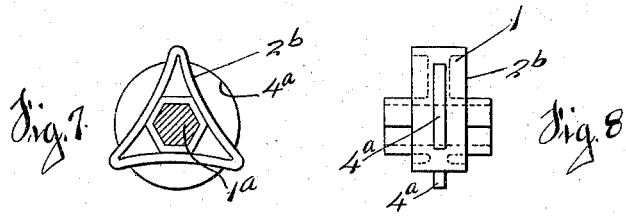
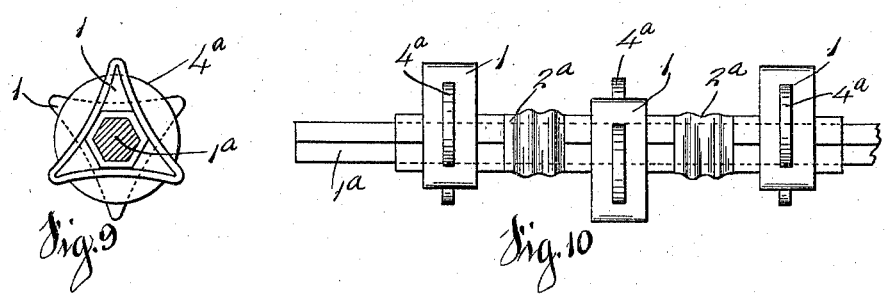
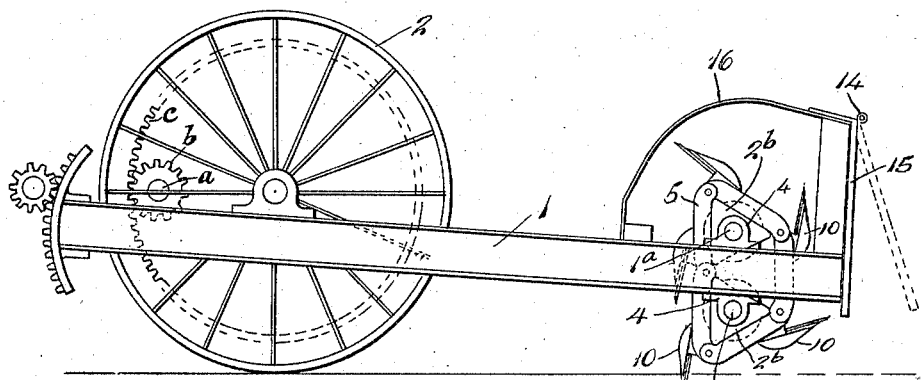

CHRISTIAN F. HEINSS, OF POINT PLEASANT, WEST VIRGINIA.

MOTOR-PLOW.

1,302,657.  Specification of Letters Patent.  Patented May 6, 1919.

Application filed September 24, 1917.  Serial No. 192,859.

*To all whom it may concern:*

Be it known that I, CHRISTIAN F. HEINSS, a citizen of the United States, and a resident of Point Pleasant, in the county of Mason and State of West Virginia, have invented certain new and useful Improvements in Motor-Plows, of which the following is a full, clear, and exact description, reference being had to the accompanying drawings, forming part of this specification.

My invention relates to agricultural implements of the class known as motor plows and has special relation to the type of so-called plow which is shown and described in my Patent No. 1,170,635, dated February 8, 1916, in which the earth working devices consist in a series of spading elements mounted on endless chains and revolved faster than the progress of the machine over the ground. In my present invention I have improved the construction and operation whereby a more effective machine is provided and the cost of manufacture reduced by that certain novel construction and arrangement of parts to be hereinafter particularly pointed out and claimed whereby the manual operation of a spade in thrusting straight down into the ground and then turning to the horizontal position to cut out and break up the soil is more effectually approximated and the soil is broken up and pulverized and not merely turned over as in plowing.

My machine, therefore, is in reality a motor spading machine which digs up the ground, turns it over and pulverizes it in a single operation, rendering the soil as fine and smooth as if it were both plowed and harrowed, so that the ground is completely prepared for planting with a single passage of the machine over the field.

One of the important features of my improved machine consists in the use of triangular shaped sprockets in which the sprockets for each set of spades are brought close together and by preference in a vertical plane so that for each of the endless chain spading elements only five links are required. With this construction, I am able to avoid any tendency of the spading elements to drag or scrape as the machine moves over the ground, thus requiring less power to propel the machine. At the same time the small number of links in the endless chain permits of a much more compact design, and so much vibration is obtained in the use of such three-sided sprockets that the earth is shaken from the spades and chains and the parts kept practically clean without the necessity of employing any scraping elements intermediate the series of endless chains.

In the drawings,

Figures 1, 2, 3 and 4 are side elevations of the triangular sprockets and chain links with the spades showing the parts in four successive positions which are assumed in the counter clockwise rotation of the parts, beginning with Fig. 1 and ending with Fig. 4.

Fig. 5 is a side elevation, and Fig. 6 a top plan view of one of the chain links with the spade attached.

Fig. 7 is a side elevation, and Fig. 8 a front elevation of one of the sprocket elements.

Fig. 9 is an end elevation, and Fig. 10 a front elevation of the sprockets showing the method of mounting same on the carrying shaft.

Fig. 11 is a side elevation of the rear half of the motor plow.

As in my former patent, the entire implement comprises two substantial frames, a front frame carrying a motor and supported on an axle upon which is mounted the front carrying wheels of the machine, and a rear frame in which the cultivator mechanism and rear carrying wheels are mounted. The rear framework is indicated at 1, and the carrying and driving wheels at 2, these wheels being driven by the motor driven shaft $a$ carrying a pinion $b$ engaging the internal teeth $c$ on the carrying wheels.

Journaled in suitable journal boxes 4 in the sides of the frame 1 are hexagonal shafts $1^a$, $1^a$, and on these shafts are strung the triangular sprockets $2^b$ which are spaced apart by spacing sleeves $2^a$. The face of each triangle is preferably somewhat concave and is of a length substantially the length of one link of the spading elements. Upon each face of the sprocket are formed semi-circular teeth or lugs $4^a$ which engage the slotted portions of the links of the chain, and the faces of the triangular sprockets are concave to give the teeth a free opportunity to find the slots of the chain links.

In a machine of a convenient size, there will preferably be provided eight endless chains of five links each traveling over the same number of sprockets on the two shafts. Of course, for larger or smaller machines, the number of sprockets and endless chains would be increased or diminished accordingly, and in mounting the sprockets, each sprocket is provided with a hexagonal hole so that it fits over the hexagonal shaft, and the sprockets can be readily and easily secured in place.

In mounting the sprockets in series, every other sprocket is set so as to bring the sprocket teeth in a different position for the alternate series, as indicated in the end elevation (Fig. 9).

The chains are made up each with five large links 5, with the central portion open to leave a space 6 for engagement with the teeth or lugs 4ª, and each link has one bifurcated end 7 and a boss 8 at the other end for pivotal engagement between the bifurcated ends of the next link. In view of the fact that the teeth on the sprocket are semicircular, they will enter the links without jarring, grinding or undue friction, which is of particular importance in view of the sharp turn required by reason of the fact that the sprockets are triangular.

As already described, the sprockets are set in like position for each chain, but in different positions for the series. Thus in Fig. 1, each sprocket has an angle pointed upward and a flat side downward. Fig. 2 shows the two sprockets at 30° from their position in Fig. 1; Fig. 3 at 30° from Fig. 2; and Fig. 4 at 30° from Fig. 3. The links have located at the forward end thereof a flat tongue 9 extending at a little off the parallel with the link. The upper or outer side of each tongue is reinforced by a curved buttress 10, and the spades are to be attached to the flat under side thereof. These spades 11 comprise blades of the desired length demountably secured to the tongues by means of bolts 13 or in any other desired manner. One machine may be furnished with different lengths of spades for different types of work. The spades extend in line with the under sides of the tongues.

The vibratory movement of the chains which results in throwing off the adherent soil can be seen by following the spade indicated at A in Figs. 1 to 4. In Fig. 1, it will be seen that the spade at A is quite far from the center line connecting the axis of the two drums. In Figs. 2 and 3, it is considerably closer, and in Fig. 4 it is back again at the full distance.

The digging movement can be observed by following the spade indicated at B in Figs. 1 to 4. If it is remembered that the machine is moving along in the opposite direction to the movement of the spades in digging, it will be understood that allowing for this movement the spades are thrust substantially vertically into the soil. As at B in Fig. 1, the spades approach the ground almost perpendicularly, and as shown in Fig. 2 at B the spades sink down into the ground vertically. They start to turn at the lowest point as in Fig. 3, and then scoop upwardly the earth which has been dislodged as seen at B in Fig. 4.

In order that the soil thrown back by the spades may not become scattered and to more effectually break up and pulverize the ground, I hinge to the rear frame at 14 a fall-board 15 which, when the machine is at rest, takes a substantially vertical position but, as the dirt is thrown up against it when the machine is in use, the board swings outwardly under the pressure of the material into an angular position. The fall-board thus, as it were, floats on the soil thrown up against it, allowing clods to be broken and generally the material more effectively pulverized and evenly distributed.

I also provide a cover 16 to bridge over the space between the fall-board and the front portion of the machine so that the spading devices are effectively covered in the finished machine.

I have found from many tests made of the machine above described that one passage of the machine over the ground will dig up the earth to the depth of the usual plowing, thoroughly mix the dug-up soil, break it into fine particles, and leave the pulverized earth in a level bed, ready for planting. It is thus possible to use a planting machine as a trailer behind my motor plow, and plant and cultivate the field all at one time.

Having thus described my invention, what I claim as new and desire to secure by Letters Patent, is:—

1. In a motor plow, an actuated spading mechanism comprising a plurality of chains, spading blades on the links of the chains, and triangular sprockets over which said chains pass, whereby a spading action is obtained and the chains are given a vibratory motion to shake off the adherent earth.

2. In a motor plow, an actuated spading mechanism comprising a plurality of chains, spading blades on the links of the chains located near the pivotal points thereof, and triangular sprockets over which said chains pass, whereby a spading action is obtained and the chains are given a vibratory motion to shake off the adherent earth.

3. In a motor plow, an actuated spading mechanism comprising a plurality of chains, spading blades on the links of the chains located near the pivotal points thereof, and triangular sprockets over which said chains pass, said sprockets having sides of a width equal to the length of a link of the chains, whereby a spading action is obtained and the chains are given a vibratory motion to shake off the adherent earth.

4. In a motor plow, an actuated spading mechanism comprising a plurality of chains, spading blades on the links of the chains, said spading blades directed approximately parallel to the links, and triangular sprockets over which said chains pass, whereby a spading action is obtained and the chains are given a vibratory motion to shake off the adherent earth.

5. In a motor plow, an actuated spading mechanism comprising a plurality of chains, spading blades on the links of the chains located near the pivotal points thereof, said spading blades directioned approximately parallel to the links, and triangular sprockets over which said chains pass, having sides of a width substantially equal to the length of a link of the chains, whereby a spading action is obtained and the chains are given a vibratory motion to shake off the adherent earth.

6. In a motor plow, the combination of a pair of triangular sprockets, and a chain having links to engage the same, the sprockets so disposed as to carry five chain links, with spading elements on said links, for the purpose specified.

7. In a motor plow, the combination of a pair of triangular sprockets, and a chain having links to engage the same, said links being of a length equal to the width of the faces of the sprockets, the sprockets so disposed as to carry five chain links, with spading elements on said links, for the purpose specified.

8. In a motor plow, the combination of a pair of triangular sprockets, and a chain having links to engage the same, said links being of a length equal to the width of the faces of the sprockets, the sprockets so disposed as to carry five chain links, with spading elements on said links, located near the pivotal points thereof, for the purpose specified.

9. In a motor plow, the combination of a pair of triangular sprockets, and a chain having links to engage the same, said links being of a length equal to the width of the faces of the sprockets, the sprockets so disposed as to carry five chain links, with spading elements on said links, located near the pivotal points thereof, with their spading surfaces directioned approximately parallel to the links, for the purpose specified.

10. In a motor plow, an actuated spading mechanism comprising a plurality of chains, spading blades on the links of the chains, and triangular sprockets over which said chains pass, whereby a spading action is obtained and the chains are given a vibratory motion to shake off the adherent earth, said sprockets having teeth for engaging the chains, one tooth on each triangular face, said teeth having a rounded contour, for the purpose described.

11. In a motor plow, the combination of a pair of triangular sprockets, and a chain having links to engage the same, the sprockets so disposed as to carry five chain links, with spading elements on said links, said sprockets having teeth for engaging the chains, one tooth on each triangular face, said teeth having a rounded contour, for the purpose described.

CHRISTIAN F. HEINSS.

Copies of this patent may be obtained for five cents each, by addressing the "Commissioner of Patents, Washington, D. C."